United States Patent
George, IV et al.

(12) 
(10) Patent No.: US 8,948,171 B1
(45) Date of Patent: Feb. 3, 2015

(54) SYSTEM AND METHOD FOR IP MULTICAST

(75) Inventors: Wesley E. George, IV, Manassas, VA (US); Robert E. Seastrom, Leesburg, VA (US)

(73) Assignee: Time Warner Cable Inc., New York, NY (US)

( * ) Notice: Subject to any disclaimer, the term of this patent is extended or adjusted under 35 U.S.C. 154(b) by 244 days.

(21) Appl. No.: 13/554,395

(22) Filed: Jul. 20, 2012

(51) Int. Cl.
   *H04L 12/28* (2006.01)

(52) U.S. Cl.
   USPC .......................................................... 370/390

(58) Field of Classification Search
   USPC .......... 370/312, 390, 392, 393, 395.3–395.32
   See application file for complete search history.

(56) References Cited

U.S. PATENT DOCUMENTS

| | | | | |
|---|---|---|---|---|
| 6,810,037 B1 * | 10/2004 | Kalapathy et al. | ............ | 370/392 |
| 6,879,594 B1 * | 4/2005 | Lee et al. | ...................... | 370/408 |
| 7,602,785 B2 * | 10/2009 | Dharmapurikar et al. | .... | 370/392 |
| 8,081,570 B2 * | 12/2011 | Bowes | ........................... | 370/230 |
| 8,090,805 B1 * | 1/2012 | Chawla et al. | ................ | 709/221 |
| 8,837,479 B1 * | 9/2014 | Kumar et al. | ................ | 370/390 |
| 2003/0152092 A1 * | 8/2003 | Lu | .................................. | 370/408 |
| 2003/0165140 A1 * | 9/2003 | Tang et al. | ..................... | 370/393 |
| 2005/0047411 A1 * | 3/2005 | Kadambi et al. | .............. | 370/389 |
| 2005/0232274 A1 * | 10/2005 | Kadambi et al. | .............. | 370/392 |
| 2006/0280192 A1 * | 12/2006 | Desanti | ......................... | 370/409 |
| 2009/0135820 A1 * | 5/2009 | Suzuki | .......................... | 370/390 |

OTHER PUBLICATIONS

Memo, "An Overview of Source-Specific Multicast (SSM)," S. Bhattacharyya, Ed., The Internet Society (Jul. 2003), 14 pages.

* cited by examiner

*Primary Examiner* — Thai Hoang
(74) *Attorney, Agent, or Firm* — The Marbury Law Group, PLLC

(57) ABSTRACT

A system and method for routing multicast packets. A multicast packet is received at an inbound interface on a switch/router. S,G data are obtained from the packet and used to search an OIL table. If the S,G data are found in the OIL table, the packet is forwarded on an outbound interface associated with the S,G data. If the S,G data are not found in the OIL table, the multicast routing table is consulted to obtain a longest match for the packet, and the packet is forwarded on the interface(s) which correspond to the longest match route. The multicast routing table may include a single entry, such that all packets that do not match an entry in the OIL are forwarded on the same outbound interface. The multicast routing table may include multiple entries with different covered ranges of (S,G).

10 Claims, 9 Drawing Sheets

SYSTEM AND METHOD FOR IP MULTICAST

BACKGROUND

There are three fundamental types IP addresses: unicast, broadcast, and multicast. A unicast address is designed to transmit a packet to a single destination. A broadcast address is used to send a datagram to an entire subnetwork. A multicast address is designed to enable the delivery of datagrams to a set of hosts that have been configured as members of a multicast group in various scattered subnetworks. Multicasting is not connection oriented.

A multicast IP packet is assigned a "group address" in the destination address field of the IP header. A host may join or leave a multicast group at any time and may join any number of groups. A host may be a member of more than one multicast group at any given time.

A group membership protocol is employed by routers to learn about the presence of group members on their directly attached subnetworks. When a host joins a multicast group, it transmits a group membership protocol message for the group(s) that it wishes to receive, and sets its IP process and network interface card to receive frames addressed to the multicast group.

IP multicast allows the network elements in the path of a given traffic flow to replicate that flow such that it can be sent to multiple receivers from a single source. For example, A sources content, sends it to B. B replicates the content and sends a copy to C and D.

Various protocols are used to manage multicasting content to ensure that the content is directed downstream to subscribing hosts efficiently. Efficiencies in this context encompass minimizing unnecessary forwarding and avoiding loops among hosts and routers.

The Internet Group Management Protocol (IGMP) runs between hosts and their immediately neighboring multicast routers. The mechanisms of the protocol allow a host to inform its local router that it wishes to receive transmissions addressed to a specific multicast group. Also, routers periodically query the LAN to determine if known group members are still active. If there is more than one router on the LAN performing IP multicasting, one of the routers is elected "querier" and assumes the responsibility of querying the LAN for group members.

Based on the group membership information learned from the IGMP, a router is able to determine which (if any) multicast traffic needs to be forwarded to each of its "leaf" subnetworks. Multicast routers use this information, in conjunction with a multicast routing protocol, to support IP multicasting across the Internet.

A series of routes from a source is referred to as a source "tree." A source tree is the simplest form of distribution tree. The source host of the multicast traffic is located at the root of the tree, and the receivers are located at the ends of the branches. Multicast traffic travels from the source host down the tree toward the receivers. The forwarding decision on which interface a multicast packet should be transmitted out is based on a multicast forwarding table. This table consists of a series of multicast state entries that are cached in the router. State entries for a source tree use the notation (S, G). The letter S represents the IP address of the source, and the letter G represents the group address.

For example, a source 196.7.89.10 that is transmitting multicast packets to the destination group 239.194.0.5 has a forwarding cache entry of (196.7.89.10, 239.194.0.5). A separate source tree exists for every source that is transmitting multicast packets, even if those sources are transmitting data to the same group. This means that there will be an (S, G) forwarding state entry for every active source in the network. For example, if another source, such as 196.1.23.4, became active that was also transmitting to group 239.194.0.5, then an additional state entry would be created as (196.7.25.18, 239.194.0.5). Source trees provide optimal routing at the cost of additional multicast state information in the network.

Packets from a source must arrive on the correct interface. A packet that arrives on the correct interface is replicated on one or more outgoing interfaces that are associated with the group address and saved to an Outgoing Interface List ("OIL" or "OLIST").

The S,G pair data and the OIL data are typically referred to as state data. These data are maintained by each multicast switch and router in a source tree. For high-end routing and switching platforms, scaling is not an issue. However, lower-end platforms such as those typically used as top-of-rack (or "TOR") switches in a datacenter environment often have significantly reduced scaling capabilities. In a datacenter environment, the scaling limitations manifest as finite limitations in the maximum number of simultaneous multicast groups that can be flowing through the device, usually a few hundred or thousand groups per device.

In unicast routing, routes to individual hosts are not generally contemplated. Instead, bit masks are used to allow for an aggregated match for a given set of destination IP addresses. In the case where multiple candidate matches exist, the longest or most specific bit mask match is always preferred. This is commonly notated in the form x/y, where x is an address prefix (e.g. 192.0.2.0 or 2001:db8::) and y is the number of left-justified bits in the bitmask. For example, 2001:db8::/32 means that the bitmask is the first 32 bits of the prefix in question. Moreover, if the routing table contains routes for both 192.0.2.0/24 and 192.0.2.64/28, then when routing a packet to 192.0.2.68, the latter route will be preferred. An equivalent concept does not currently exist for multicast routing. All multicast routing is done by explicit matches of destination group (S,G) as described above.

In a datacenter, there will typically be a switch/router that aggregates the traffic from a number of individual or blade center style servers or other network appliances (purpose-built hardware for a certain task). The collection of equipment that is connected to a particular switch/router is referred to herein as an equipment "rack" without regard to the physical arrangement of the switch/router and its connected devices. There may be multiple racks in a datacenter, and each switch/router aggregates data upward to a core switch so that the aggregated data may be sent towards its final destination.

In the case where servers in a datacenter are being used as sources for multicast content, such as in large-scale IP video and audio distribution, each server may have one or more specific types of content in varying formats and bitrates that it is streaming to one or more individual multicast group addresses for distribution to the rest of the network. In this configuration, there may be hundreds or even thousands of individual, discrete multicast sources and groups in a single rack lineup, each representing unique content being served from this location.

The servers in the datacenter may also receive data streams, including multicast data streams, from other devices. The received data streams may be processed by the servers such that a single stream may exit the server as multiple streams. By way of illustration and not by way of limitation, a data stream may be processed to provide content to devices having different capabilities, operating systems, and display characteristics.

A commodity switch/router is challenged to maintain this level of multicast state. When the capacity of the switch/router is reached, it is typically replaced with hardware with higher capacities and capabilities at significant additional cost.

At the hardware level, a typical switch/router has a control plane that interacts with other devices at the protocol level (for example, BGP, IGMP) to learn the topology of available paths and routes and a forwarding plane that moves data from one port to another. The control plane uses the topology data to instruct the forwarding plane how data is to be routed through the switch/router.

In the case of multicasting, the control plane relies on IGMP (either through direct participation or snooping) to determine which ports are connected to hosts that want to join a particular multicast group having a specified S, G pair. The joins are used to populate the OIL, which assigns particular multicast traffic to particular ports. The data from a multicast source (S,G) may be replicated to multiple ports that are each connected to at least one subscribing host. The replication usually occurs in the forwarding plane. Each S,G pair has unique control plane entries that relate an S,G pair to a port. As the number of multicast streams handled by a rack increases, the demand on the switch/router increases and ultimately may exceed the capacity of the switch/router to manage the volume of state information required for effective multicast routing.

SUMMARY

Embodiments are directed to a switching/routing architecture that identifies multicast forwarding decisions that do not require multicast state information to reduce the demand on a switch/router and thereby provide a highly scalable multicasting routing.

DETAILED DESCRIPTION

Embodiments are directed to a switching/routing architecture that identifies multicast forwarding decisions that do not require multicast state information to reduce the demand on a switch/router to provide a highly scalable multicasting routing.

Figure 1:
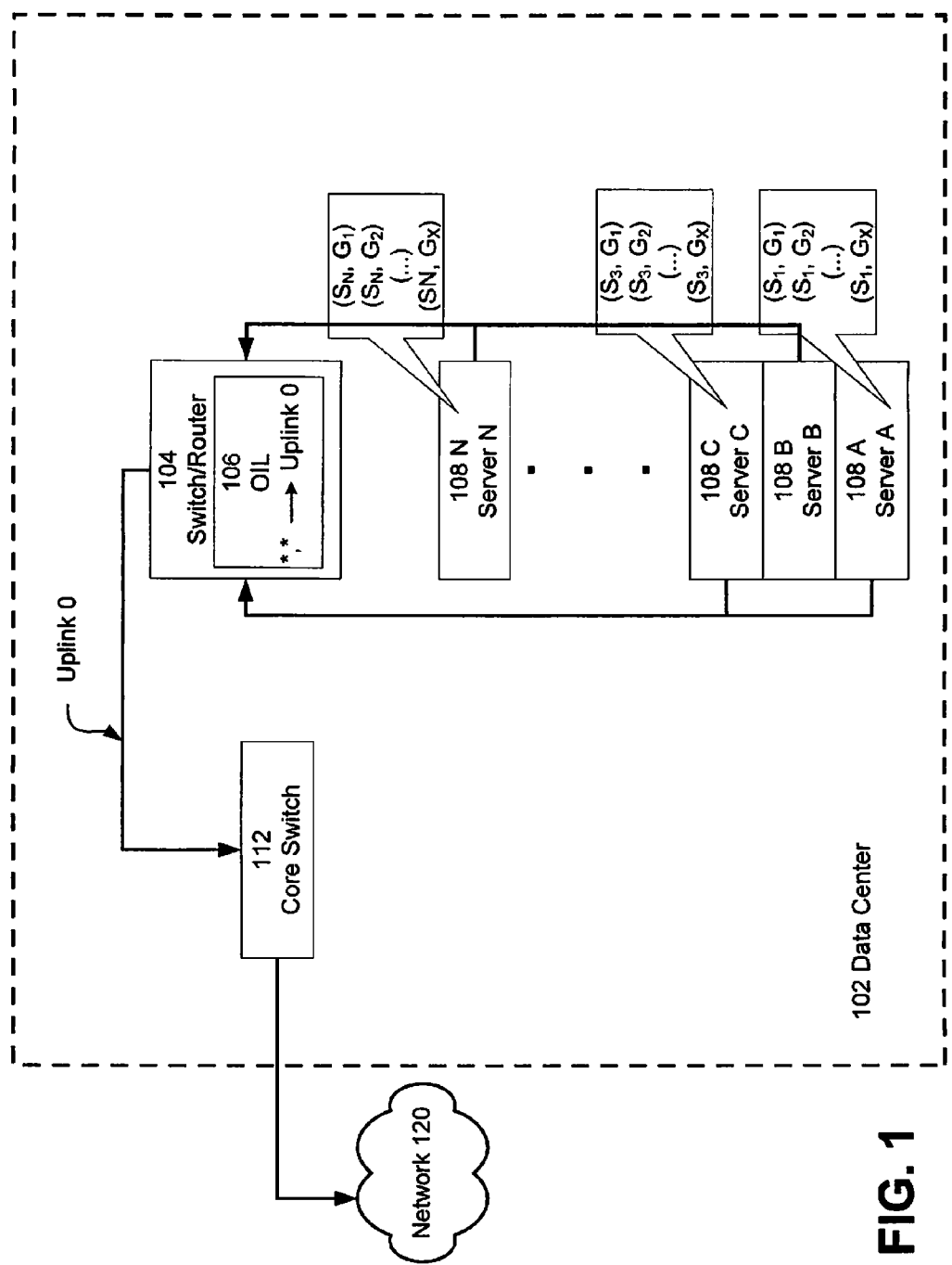
FIG. 1 is a block diagram illustrating a switching/routing architecture that uses a stateless switch/router according to an embodiment.

The switching/routing architecture illustrated in FIG. 1 includes servers 108A through 108N connected to a switch/router 104. The switch/router 104 is connected to a core switch 112. The core switch 112 is connected to a network 120. The core switch 112 maintains state such that a particular S,G pair is routed through the core switch 112 to ports assigned using IGMP.

In this embodiment, the servers 108A through 108N are the source for some number of multicast groups which are destined outbound. By way of illustration and not by way of limitation, the servers may be serving content found on their internal disks or they may be gaining content from a unicast source and then processing it before sending it out as multicast. In this embodiment, the switch/router 104 uses an OIL that includes a single routing entry that matches all multicast addresses. The switch/router 104 aggregates data from servers 108A through 108N, uses longest-match routing and references the OIL 106 to route all traffic through a single uplink (Uplink 0) to core switch 112. Thus, the switch/router 104 need not refer to dynamic state information in order to forward multicasting data within the data center 102. Rather, the switch/router is programmed to route all aggregated data to a single port via a single wildcarded entry.

Figure 2:
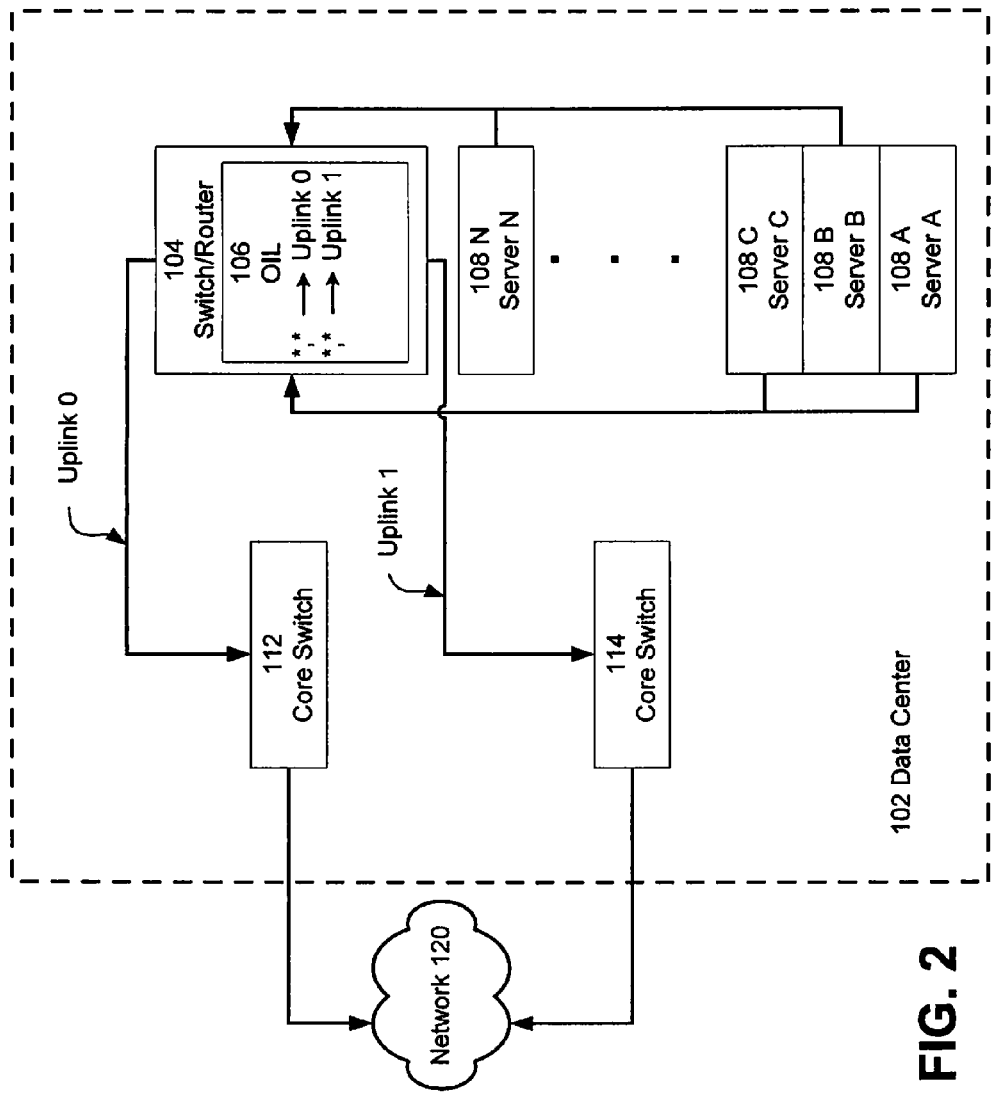
FIG. 2 is a block diagram illustrating a switching/routing architecture that uses a stateless switch/router according to an embodiment.

FIG. 2 is a block diagram illustrating a switching/routing architecture that uses a stateless switch/router having multiple uplinks according to an embodiment.

As illustrated in FIG. 2, the OIL 106 holds no specific information on a per (S,G) basis. Rather, the OIL is configured with a list of interfaces (or ports) to which all multicast traffic, or multicast traffic in a certain range based on longest match, will be sent. As illustrated in FIG. 2, the OIL 106 includes two interface mappings. However, this is not meant to be limiting, and additional mappings are possible. In this embodiment, IGMP is ignored. The forwarding plane is programmed so that all (or a range of) multicast traffic regardless of source or group is replicated and forwarded to all of the ports in the configured list.

Figure 3A:
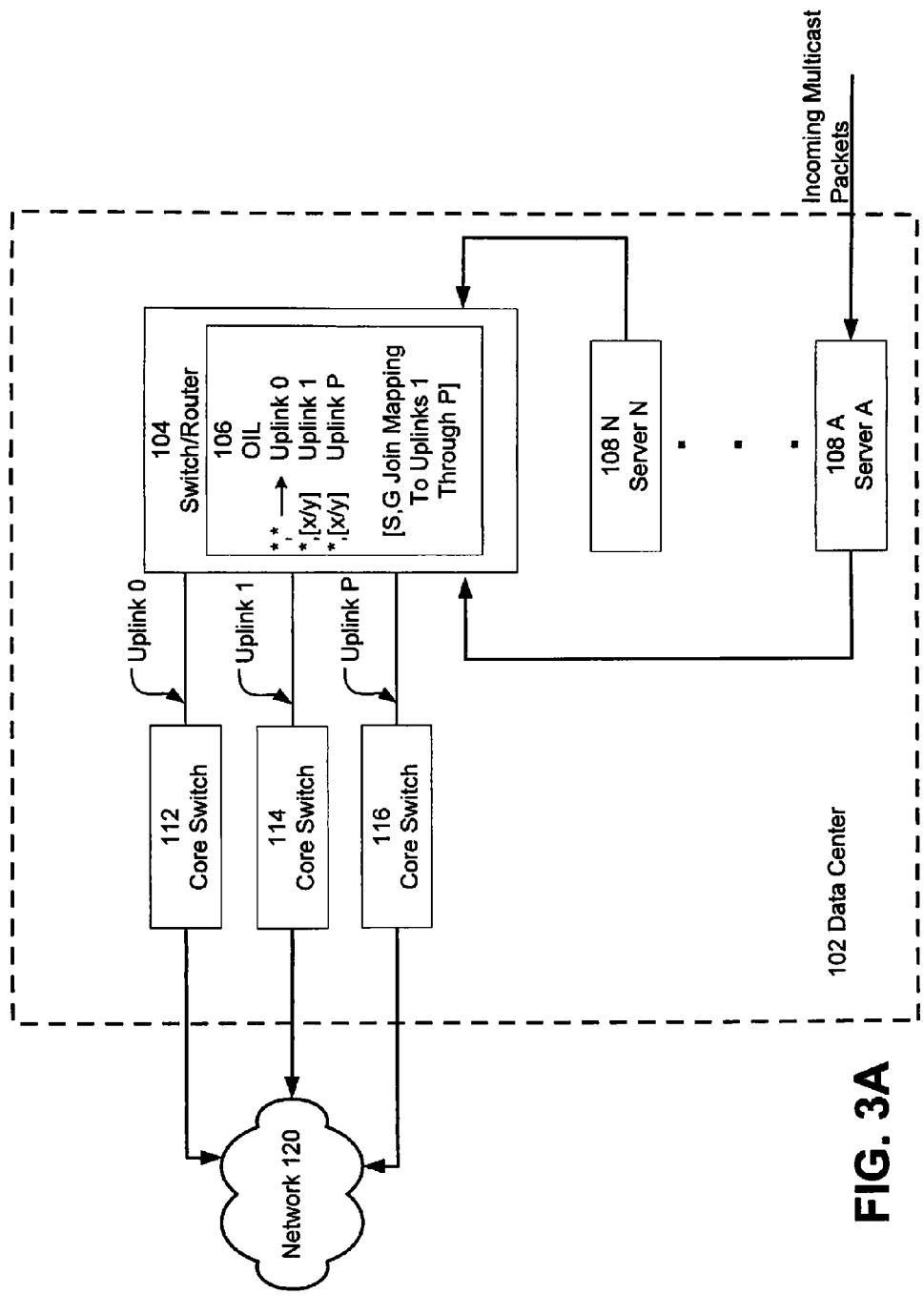
FIG. 3A is a block diagram illustrating a switching/routing architecture that selectively replicates and forwards multicast streams according to an embodiment.

FIG. 3A is a block diagram illustrating a switching/routing architecture that selectively replicates and forwards multicast streams according to an embodiment.

In an embodiment, the switch/router 104 determines whether the S,G pair of a multicast data stream is mapped to a port in the OIL 106. If there is a specific S,G entry, this is the longest match. When an S,G pair is not mapped to a port in the OIL 106, the multicast data stream is routed in accordance with its longest match. Thus, in this embodiment, not all S,G pairs are explicitly represented by state information thereby reducing the burden on the switch/router 104.

In an embodiment, the control plane has a last resort entry pointing all multicast traffic or a range of multicast S,G pairs to one or more configured ports, but still listens for IGMP on ports not configured in the default list and builds specific OIL for those items. The forwarding plane is programmed so that all (or a range of) multicast traffic regardless of source or group is replicated and forwarded to all of the ports in the configured list.

Figure 3B:
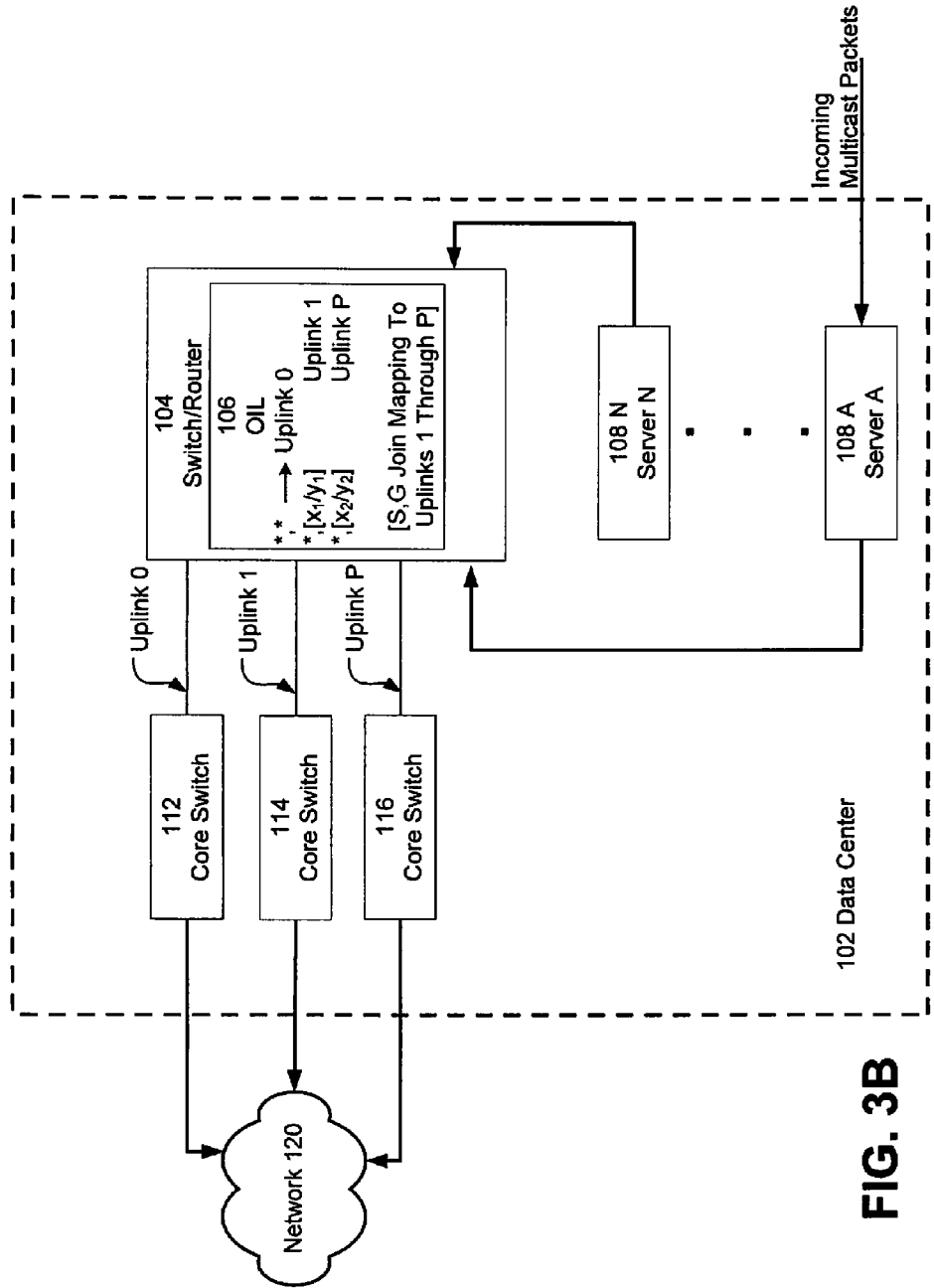
FIG. 3B is a block diagram illustrating a switching/routing architecture that selectively forwards multicast streams via different ports according to an embodiment.

FIG. 3B is a block diagram illustrating a switching/routing architecture that selectively forwards multicast streams via different ports according to an embodiment.

In an embodiment, the switch/router 104 determines whether the S,G pair of a multicast data stream is mapped to a port in the OIL 106. If there is a specific S,G entry, this is the longest match. When an S,G pair is not mapped to a port in the OIL 106, the multicast data stream is routed in accordance with its longest match. In an embodiment, multiple different matching bitmasks are possible. These may be disjointed or overlapping, and the longest match will always be preferred. In this embodiment, by way of example and not by way of limitation, *,[$x_1/y_1$] maps to Uplink 1, while *,[$x_2/y_2$] maps to Uplink P. Thus, in this embodiment, not all S,G pairs are explicitly represented by state information thereby reducing the burden on the switch/router 104.

In an embodiment, the control plane has entries pointing all multicast traffic or a range of multicast S,G pairs to one or more configured ports, but still listens for IGMP on ports not configured in the default list and builds specific OIL for those items. The forwarding plane is programmed so that all (or a range of) multicast traffic regardless of source or group is replicated and forwarded to all of the ports in the configured list.

Figure 3C:
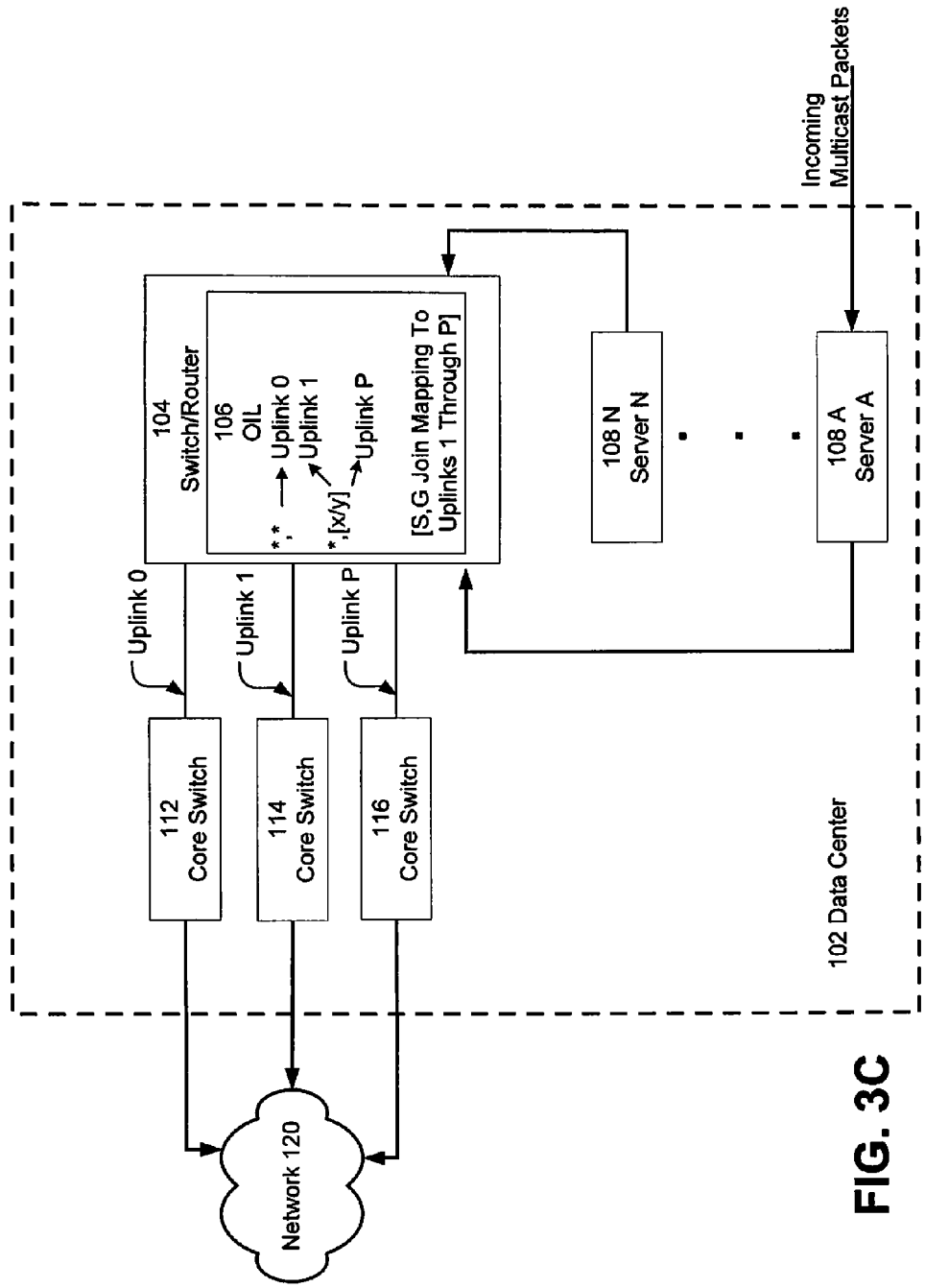
FIG. 3C is a block diagram illustrating a switching/routing architecture that selectively forwards multicast streams using a load balancing algorithm according to an embodiment.

FIG. 3C is a block diagram illustrating a switching/routing architecture that selectively forwards multicast streams using a load balancing algorithm according to an embodiment.

In an embodiment, the switch/router 104 determines whether the S,G pair of a multicast data stream is mapped to a port in the OIL 106. If there is a specific S,G entry, this is the longest match. When an S,G pair is not mapped to a port in the OIL 106, the multicast data stream is routed in accordance with its longest match. In an embodiment, multiple different matching bitmasks are possible. These may be disjointed or overlapping, and the longest match will always be preferred. In this embodiment, by way of example and not by way of limitation, *,[x/y] maps to two (or more) uplinks, which are used together as additional bandwidth. Traffic which traverses these interfaces may be load-balanced using any of several methods to determine traffic distribution between the available interfaces. By way of example and not by way of limitation, these load-balancing methods might include: round-robin, source/destination hashing, source MAC address hashing, stochastic, shortest queue, etc. Thus, in this embodiment, not all S,G pairs are explicitly represented by state information thereby reducing the burden on the switch/router 104.

In an embodiment, the control plane has entries pointing all multicast traffic or a range of multicast S,G pairs to one or more configured ports, but still listens for IGMP on ports not configured in the default list and builds specific OIL for those items. The forwarding plane is programmed so that all (or a range of) multicast traffic regardless of source or group is replicated and forwarded to the port in the configured list that is chosen by the implemented load-balancing algorithm.

Figure 3D:
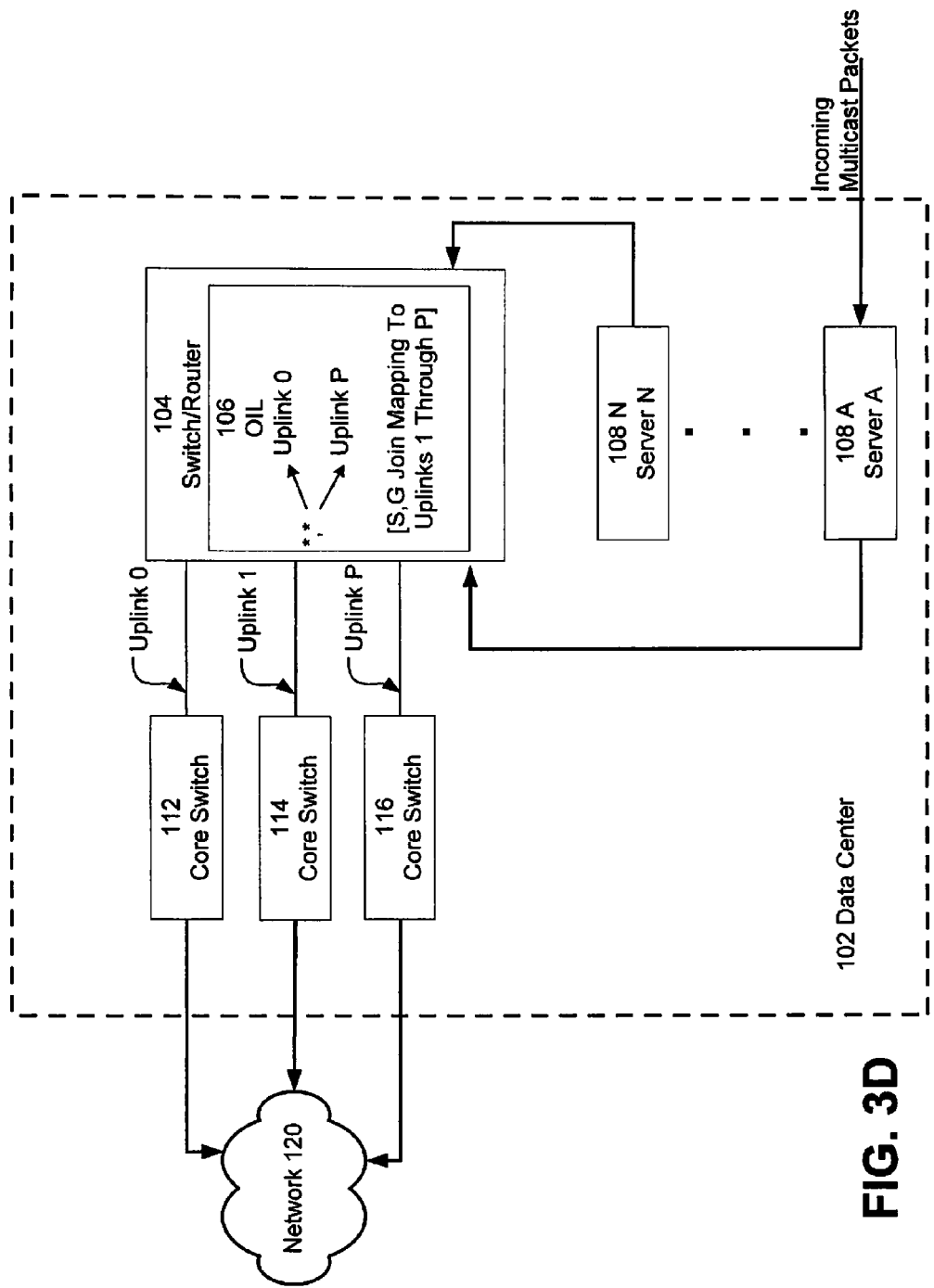
FIG. 3D is a block diagram illustrating a switching/routing architecture that selectively forwards multicast streams using a load balancing algorithm according to another embodiment.

FIG. 3D is a block diagram illustrating a switching/routing architecture that selectively forwards multicast streams using a load balancing algorithm according to another embodiment.

In an embodiment, the switch/router 104 determines whether the S,G pair of a multicast data stream is mapped to a port in the OIL 106. If there is a specific S,G entry, this is the longest match. When an S,G pair is not mapped to a port in the OIL 106, the multicast data stream is routed in accordance with its longest match. In this embodiment, by way of example and not by way of limitation, *,* maps to two (or more) uplinks, which are used together as additional bandwidth. Traffic which traverses these interfaces may be load-balanced using any of several methods to determine traffic distribution between the available interfaces. By way of example and not by way of limitation, these load-balancing methods might include: round-robin, source/destination hashing, source MAC address hashing, stochastic, shortest queue, etc. Thus, in this embodiment, not all S,G pairs are explicitly represented by state information thereby reducing the burden on the switch/router 104.

In an embodiment, the control plane has entries pointing all multicast traffic or a range of multicast S,G pairs to one or more configured ports, but still listens for IGMP on ports not configured in the default list and builds specific OIL for those items. The forwarding plane is programmed so that all (or a range of) multicast traffic regardless of source or group is replicated and forwarded to the port in the configured list that is chosen by the implemented load-balancing algorithm.

Figure 4:
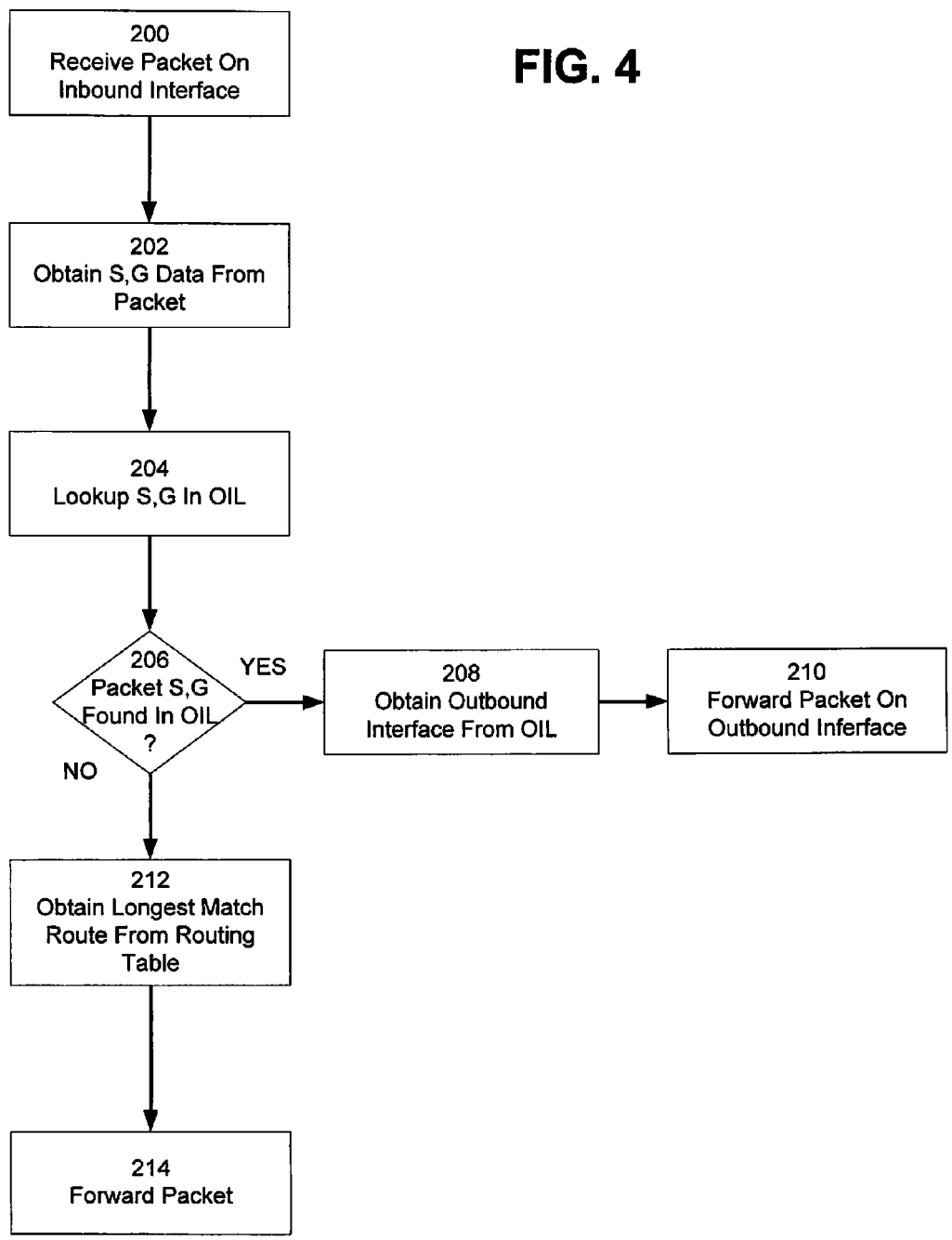
FIG. 4 is a flow diagram illustrating the logic used to selectively forward multicast streams according to an embodiment.

FIG. 4 is a flow diagram illustrating the logic used to selectively forward multicast streams according to an embodiment.

A multicast packet is received at an inbound interface on a switch/router. (Block 200.) The S,G data are obtained from the packet (Block 202) and used to search an OIL table (Block 204). If the S,G data are found in the OIL table, that is if the result of Block 206 is "YES," the outbound interface associated with the S,G data for the packet is obtained (Block 208) and the packet is forwarded on the outbound interface (Block 210).

If the S,G data are not found in the OIL table, that is if the result of Block 206 is "NO," the longest matching route is obtained from the multicast routing table (Block 212). The packet is forwarded on the interface(s) which correspond to the longest match. (Block 214). In an embodiment, the multicast routing table may include a single entry matching all or part of the multicast address range, such that all packets that do not match an entry in the OIL are forwarded on the same outbound interface. In another embodiment, the multicast routing table includes mappings to multiple interfaces such that multicast packets for which the entry is the longest match can be replicated and forwarded on multiple interfaces. In another embodiment, the multicast routing table includes mappings to multiple interfaces such that multicast packets for which the entry is the longest match can be load-balanced/distributed evenly among multiple interfaces to increase the available outbound bandwidth. In all cases, the selection of the outbound interface(s) for the packet is based on the group address of the packet.

Figure 5:
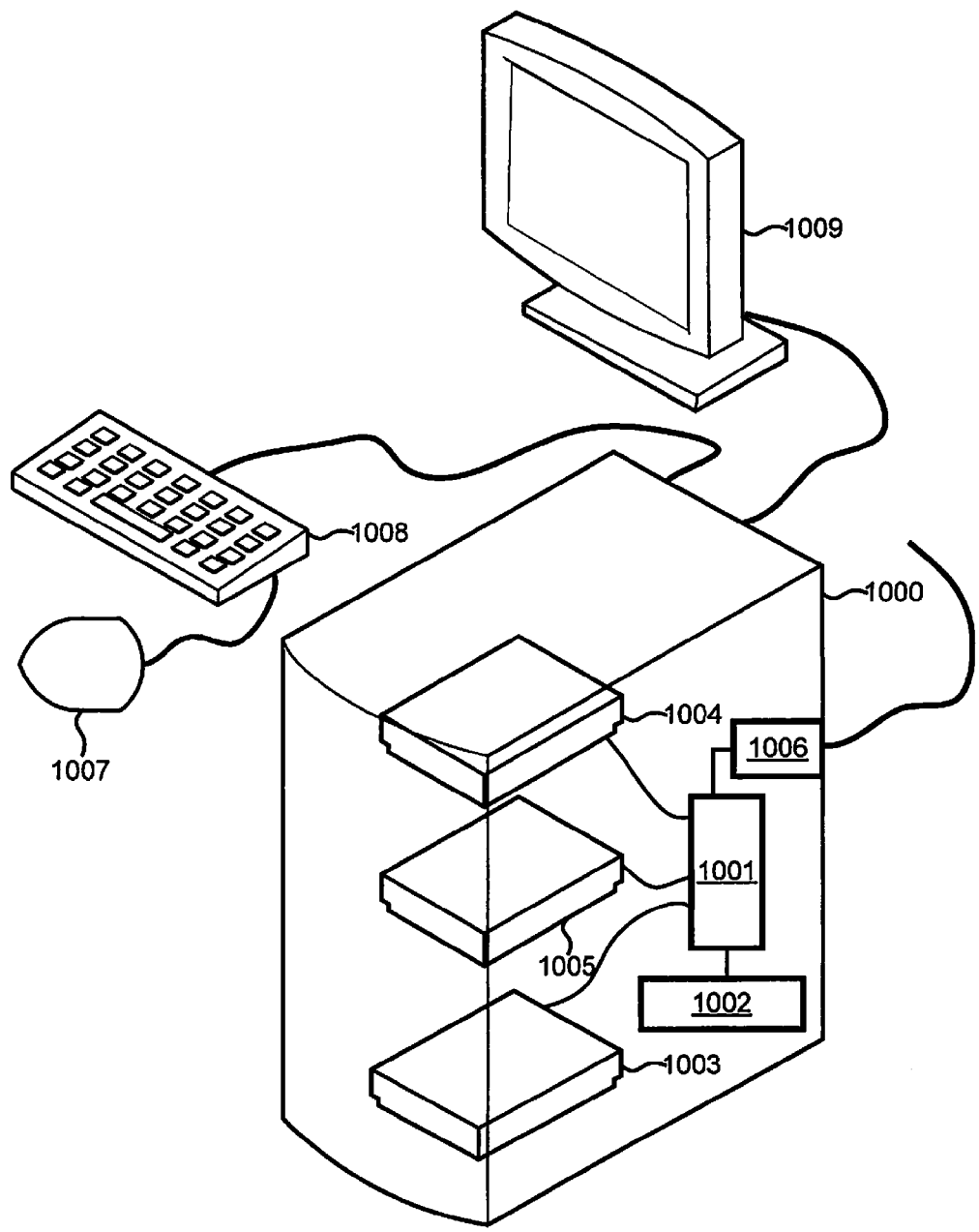
FIG. 5 is a block diagram illustrating a computing device.

FIG. 5 is a block diagram of a computing device suitable for use with any of the embodiments.

As previously described, the subscriber may interact with the various servers and network components using a variety of the computing devices, including a personal computer. By way of illustration, the functional components of a computing device 1000 are illustrated in FIG. 5. Such a computing device 1000 typically includes a processor 1001 coupled to volatile memory 1002 and a large capacity nonvolatile memory, such as a disk drive 1003. Typically, software applications, such as an email client, may be stored in the internal memory 1002 before they are accessed and loaded into the processor 1001. The processor 1001 may include internal memory sufficient to store the application software instructions.

The computing device 1000 may also include a floppy disc drive 1004 and a compact disc (CD) drive 1005 coupled to the processor 1001. Typically the computing device 1000 will also include a pointing device such as a mouse 1007, a user input device such as a keyboard 1008 and a display 1009. The computing device 1000 may also include a number of connector ports 1006 coupled to the processor 1001 for establishing data connections or network connections or for receiving external memory devices, such as a USB or FireWire® connector sockets.

While the computing device 1000 is illustrated as using a desktop form factor, the illustrated form is not meant to be limiting. For example, some or all of the components of computing device 1000 may be implemented as a desktop computer, a laptop computer, a mini-computer, or a personal data assistant. In a notebook configuration, the computer housing includes the pointing device 1007, keyboard 1008 and the display 1009 as is well known in the computer arts.

Figure 6:
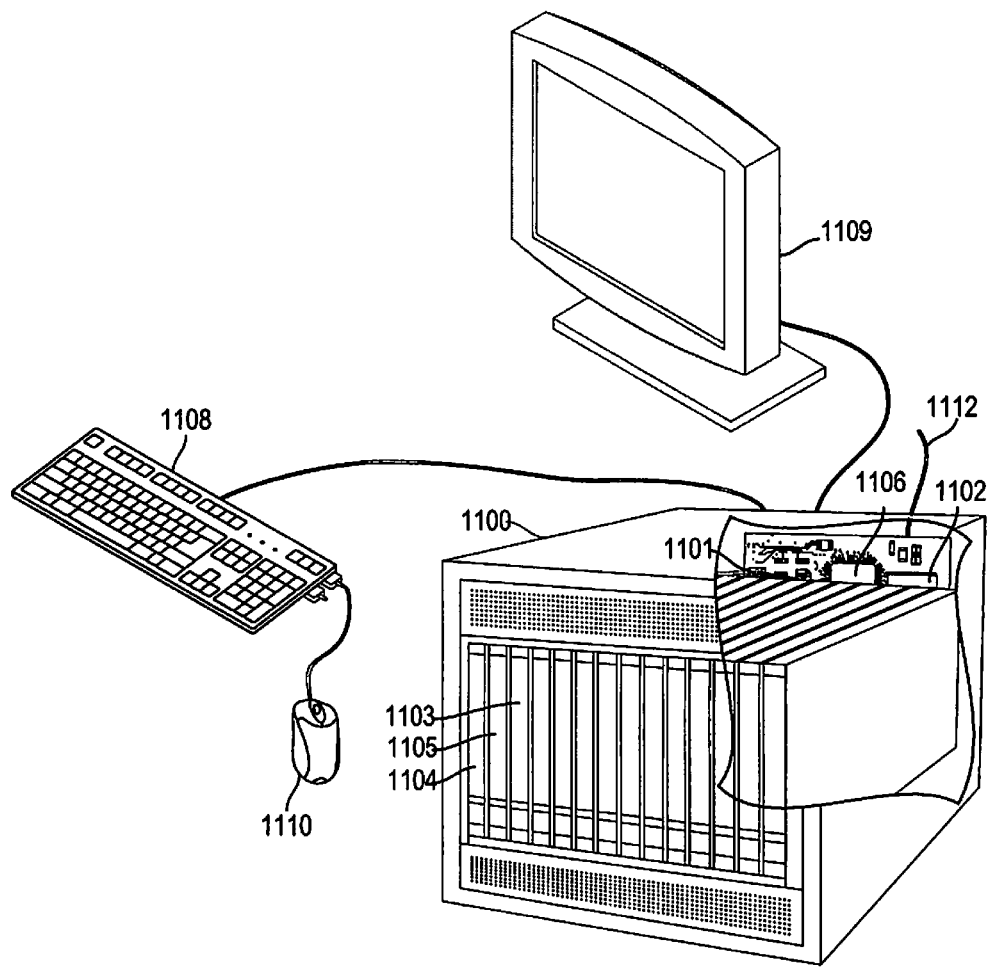
FIG. 6 is a block diagram illustrating a server device.

The various embodiments may also be implemented on any of a variety of commercially available server devices, such as the server 1100 illustrated in FIG. 6.

Such a server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1104 coupled to the processor 1101. The server 1100 may also include network access ports 1106 coupled to the processor 1101 for establishing data connections with a network 1112, such as a local area network coupled to other broadcast system computers and servers. Server 1100 may also include operator interfaces, such as a keyboard 1108, pointer device (e.g., a computer mouse 1110), and a display 1109.

The processors 1001, 1101 may be any programmable microprocessor, microcomputer or multiple processor chip or chips that can be configured by software instructions (applications) to perform a variety of functions, including the functions of the visibility rules as illustrated in various embodiments described above.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. Non-transitory computer-readable or processor-readable media include both computer storage media and tangible storage media that facilitate transfer of a computer program from one place to another. Non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A method for routing multicast packets, the method comprising:

receiving at an inbound interface on a switch/router a multicast packet, wherein the multicast packet comprises source (S) and group (G) addresses;

determining whether the S and G addresses are mapped to an outbound interface in an Outgoing Interface List (OIL) table;

obtaining from the OIL table a single routing entry for an outbound interface, wherein the single routing entry comprises a longest partial match of an address of the outbound interface and the S and G addresses, when the S and G addresses are not mapped to any outbound interface in the OIL table; and forwarding the multicast packet over the outbound interface.

2. The method of claim 1, further comprising:

building a second OIL table comprising the routing entry for the outbound interface and the S and G addresses.

3. The method of claim 2, further comprising detecting Internet Group Management Protocol (IGMP) information for the outbound interface and building the second OIL table comprising the routing entry for the outbound interface and the S and G addresses based on the IGMP information.

4. The method of claim 1, further comprising:

determining that the S and G addresses fall within a predetermined range of S and G addresses; and forwarding the multicast packet to a plurality of outbound interfaces in the OIL table regardless of whether the S and G addresses are mapped to an outbound interface of the OIL table.

5. A method for routing multicast packets, the method comprising:

receiving at an inbound interface on a switch/router a multicast packet, wherein the multicast packet comprises source (S) and group (G) addresses;

determining whether the S and G addresses are mapped to an outbound interface in an Outgoing Interface List (OIL) table;

obtaining from the OIL table a first routing entry for a first outbound interface and a second routing entry for a second outbound interface, wherein the first routing entry comprises a partial match of a first address of the first outbound interface and the S and G addresses and the second routing entry comprises a partial match of a second address of the second outbound interface and the S and G addresses, when the S and G addresses are not mapped to an outbound interface in the OIL table;

determining which of the first and second routing entries comprises a longest partial match of the respective first and second outbound interface addresses and the S and G addresses; and forwarding the multicast packet over the determined first or second outbound interface.

6. The method of claim 5, wherein the first and second routing entries further comprise disjointed partial matches of the respective first and second outbound interface addresses and the S and G addresses.

7. The method of claim 5, wherein the first and second routing entries further comprise overlapping partial matches of the respective first and second outbound interface addresses and the S and G addresses.

8. The method of claim 5, further comprising:

determining which of the first and second outbound interfaces comprises a smaller traffic distribution; and forwarding the multicast packet over the first or second outbound interface comprising the longest partial match of the respective first and second outbound interface addresses and the S and G addresses and the smaller traffic distribution.

9. A method for routing multicast packets, the method comprising:

receiving at an inbound interface on a switch/router a multicast packet, wherein the multicast packet comprises source (S) and group (G) addresses;

determining whether the S and G addresses are mapped to an outbound interface in an Outgoing Interface List (OIL) table;

obtaining from the OIL table a plurality of routing entries for outbound interfaces, wherein each routing entry comprises a partial match of an address of an outbound interface and the S and G addresses, when the S and G addresses are not mapped to any outbound interface in the OIL table; and forwarding the multicast packet over each outbound interface.

10. The method of claim 9, further comprising:

determining a traffic distribution among the each of the outbound interfaces; and forwarding the multicast packet over the each of the outbound interfaces according to the traffic distribution.

\* \* \* \* \*

UNITED STATES PATENT AND TRADEMARK OFFICE
CERTIFICATE OF CORRECTION

| | |
|---|---|
| PATENT NO. | : 8,948,171 B1 |
| APPLICATION NO. | : 13/554395 |
| DATED | : February 3, 2015 |
| INVENTOR(S) | : George, IV |

Page 1 of 1

It is certified that error appears in the above-identified patent and that said Letters Patent is hereby corrected as shown below:

On the title page item [73]

Delete "Time Warner Cable Inc." and insert --Time Warner Cable Enterprises LLC--

Signed and Sealed this
Twenty-ninth Day of December, 2015

Michelle K. Lee
*Director of the United States Patent and Trademark Office*